(12) United States Patent
Heijmans

(10) Patent No.: US 11,981,086 B2
(45) Date of Patent: May 14, 2024

(54) CONTROLLED RETRACTION OF FILAMENT

(71) Applicant: Ultimaker B.V., Utrecht (NL)

(72) Inventor: Tom Heijmans, Utrecht (NL)

(73) Assignee: Ultimaker B.V., Geldermalsen (NL)

( * ) Notice: Subject to any disclaimer, the term of this patent is extended or adjusted under 35 U.S.C. 154(b) by 296 days.

(21) Appl. No.: 17/630,940

(22) PCT Filed: Jul. 14, 2020

(86) PCT No.: PCT/NL2020/050464
§ 371 (c)(1),
(2) Date: Jan. 28, 2022

(87) PCT Pub. No.: WO2021/020963
PCT Pub. Date: Feb. 4, 2021

(65) Prior Publication Data
US 2022/0274340 A1    Sep. 1, 2022

(30) Foreign Application Priority Data

Aug. 1, 2019 (NL) ........................................ 2023596
Nov. 26, 2019 (NL) ........................................ 2024311

(51) Int. Cl.
*B29C 64/393*    (2017.01)
*B29C 64/118*    (2017.01)
(Continued)

(52) U.S. Cl.
CPC .......... *B29C 64/393* (2017.08); *B29C 64/118* (2017.08); *B29C 64/209* (2017.08);
(Continued)

(58) Field of Classification Search
CPC ... B29C 64/118; B29C 64/209; B29C 64/393; B29C 64/321; B29C 64/106;
(Continued)

(56) References Cited

U.S. PATENT DOCUMENTS

2019/0160744 A1    5/2019   Besim

FOREIGN PATENT DOCUMENTS

CN    109531999 A    3/2019

OTHER PUBLICATIONS

Mark.giblin: "solidforum 3d community", Jul. 10, 2018.

*Primary Examiner* — Yunju Kim
(74) *Attorney, Agent, or Firm* — N.V. Nederlandsch Octrooibureau

(57) ABSTRACT

A fused filament fabrication device comprising a print head having an inlet for receiving a filament of printable material, a melt chamber and an outlet for letting out flowable printable material. A filament feeder is arranged to feed the filament into the print head and arranged to retract the filament from the print head. A controller is configured to a) order the filament feeder to retract the filament over a first distance, wherein the filament is not yet broken; b) stop heating the melt chamber; c) cooling the filament to a predefined temperature, and then d) order the filament feeder to further retract the filament over a second distance so as to break the filament. By letting the filament in the print head cool off to a temperature at which the print material hardens, a controlled breakage can be realized without the occurrence of a thread at the retracted filament.

16 Claims, 5 Drawing Sheets

(51) Int. Cl.
  *B29C 64/209* (2017.01)
  *B29C 64/321* (2017.01)
  *B33Y 10/00* (2015.01)
  *B33Y 30/00* (2015.01)
  *B33Y 50/02* (2015.01)
(52) U.S. Cl.
  CPC ............ *B29C 64/321* (2017.08); *B33Y 10/00* (2014.12); *B33Y 30/00* (2014.12); *B33Y 50/02* (2014.12)
(58) Field of Classification Search
  CPC ....... B29C 64/386; B29C 64/20; B33Y 30/00; B33Y 10/00; B33Y 50/02; B33Y 40/00; B33Y 50/00
  See application file for complete search history.

CONTROLLED RETRACTION OF FILAMENT

FIELD OF THE INVENTION

The present invention relates to a fused filament fabrication device, and to a method of controlling retraction of a filament from a print head of such a fused fabrication device. The invention also relates to a computer program product.

BACKGROUND ART

Fused filament fabrication (FFF) is a 3D printing process that uses a continuous filament of a thermoplastic material. Filament is fed from a coil through a moving, heated print head, and is deposited through a print nozzle on the growing work. The print head may be moved under computer control to define a printed shape. Usually, the print head moves in two dimensions to deposit one horizontal plane, or layer, at a time. The work or the print head is then moved vertically by a small amount to begin a new layer.

If an end-of-filament is detected, a currently used filament needs to be replaced by a next filament. Also a change of filament can be required during a build or between two builds; for example in a single print head system when another colour is requested or another type of filament.

In today's FFF printing devices, mostly a change of filament needs to be performed manually, wherein a new filament is installed by a user and fed to the print head. The user may be guided by information shown on a display of the FFF device. Recently, more automated systems occurred wherein a current filament is automatically replaced by a subsequent filament. Such automated systems may comprise several filament spools or cartridges wherein several different filaments are led through a specially designed guiding system into the print head. Since only one filament can be fed into the print head at a time, the current filament needs to be retracted before the subsequent filament can be fed into the print head.

Two types of filament retraction are known. A first one is called the "cold retraction" or "cold pull". The cold pull was normally performed in a manual way, but this cold pull can also be performed automatically. A disadvantage of an automated cold pull is that a relative high force is required to retract the filament. Such a high force asks for a strong retraction mechanism. As a consequence, a strong electrical motor is needed that is capable of pulling the filament out of the print head. This requirement may increase the costs of the device and will also make the device prone to misfunctioning; high forces can lead to slipping of the filament. When using FFF devices with Bowden tubes, the cold pull can be even more challenging. A cold pull not only requires a sufficient force, it also require a sufficient acceleration of the force. When using a Bowden tube, an acceleration of the retraction force will be flattened by the Bowden tube and as a result, the cold retract may fail. In addition, the Bowden tube may be damaged after to many cold retractions and replacement of parts is needed.

A second type of retraction is known as "warm retraction", wherein the current filament is retracted while the print head is still hot. In case if a Bowden tube type device, the non-melted part of the filament will move towards the feeder, which is in reverse mode. But some of the melted filament present will stay in the print head, and due to the visco-elastic properties of the materials used, a thin thread is created connecting the melted material in the melt chamber to the withdrawing non-melted filament. During the retraction, this thread is lengthened until it finally breaks. As a result, part of the thread will stay connected to the retracted filament. This thread is normally removed manually by a user, but in automated system, this is not possible. So the next time this filament must be fed into the print head, the thin thread at the beginning of the filament is led through the Bowden tube and into the print head. Feeding such a filament to a print head has shown to be very error sensitive.

SUMMARY OF THE INVENTION

One of the objects of the invention is to provide a fused filament fabrication device in which at least some of the problems of the prior art are solved.

A first aspect of the invention provides a fused filament fabrication device, the device comprising:
  a print head having an inlet for receiving a filament of printable material, a melt chamber and an outlet for letting out flowable printable material;
  a filament feeder arranged to feed the filament into the print head and arranged to retract the filament from the print head;
  a controller configured to control heating of the melt chamber and to control the filament feeder, wherein the controller is configured to:
    a) order the filament feeder to retract the filament over a first distance, wherein the filament is not yet broken;
    b) stop heating the melt chamber;
    c) cooling the filament to a predefined temperature, and then
    d) order the filament feeder to further retract the filament over a second distance so as to break the filament.

By letting the filament in the print head cool off to a temperature at which the print material hardens, a controlled breakage can be realized without the occurrence of a thread at the retracted filament. When using amorphous materials as printing material, the predefined temperature is selected well below the glass-transition temperature $T_g$. When using crystalline materials, the predefined temperature is below the melt temperature of the material.

In an embodiment, the first distance is just enough to stop depositing the flowable printable material. For example, the first distance lies in a range of 0.5-10 mm. This distance may depend on e.g. the materials used, the cross-section of the orifice, the size of the melt chamber. It is noted that Bowden style extruders require larger retraction as compared to direct drive systems, to relax the feeding line. So when using Bowden style extruders, the first distance may be in a range of 3-10 mm while in in direct drive system the first distance may be lower, e.g. in the range of 0.5-3 mm.

In an embodiment, the controller may be arranged to determine the first distance depending on at least one of: the printable material used, a cross-section of the outlet, a size of the melt chamber.

In an embodiment, the controller is arranged to between step a) and step c) perform the step of:
  e) retract the filament over a third distance so as to create a neck in the filament.

The third distance is preferably longer than the first distance and can be chosen in an empirical way to find the proper dimension for creating a thin neck in the filament. By later on cooling the filament, this thin neck is the place where the filament is the weakest. So when retracting the filament once more, the filament is broken at the neck. This results in a very controlled way of breaking producing no or little thread at the retracted filament. In order to create the thin neck, a preferred the third distance lies in a range of 5-15 mm.

In an embodiment, the retractions over the first distance and over the third distance are combined into a single retraction. In such an embodiment the first distance may lie in a range of 10-20 mm. By using this so-called combined retract, the deposition of the material is stopped while at the same time a neck in the filament is produced. This may save time, but since the print head will spend more time on the print, the risk of getting print artefacts is higher as compared to using two separate retract when the long retract is executed once the print head is in a parking position away from the print.

In another embodiment, the controller is arranged to after step a) to feed the filament into the print head over a distance equal to the first distance. This so-called unretract is preferred in case of crystalline materials, and will make the thick neck disappear again, so as to avoid any weak spot in the filament. Following this unretract, which may take place at a parking location of the print head, the print head is cooled and the filament is retracted over the second distance. Due to the retraction over the second distance in step d) the filament is broken within the melt chamber of the print head.

In an embodiment, the second distance lies between 20-80 mm. these values have proofed to give good results. In step d) the filament may be retracted with a speed lying in an range 20-50 mm/s. Other values are possible. It may also be conceivable that the filament is fully retracted in order to retract the filament out of the Bowden tube and possibly out of the feeder. This will already give way for a subsequent filament to be led into the printer. In this case, the second distance is above 200 mm.

In step d) the filament may be retracted with an acceleration of lying in an range 1000-4000 mm/s$^2$. These values are advantageous because then a sufficient force on the filament is produced.

According to a further aspect, there is provided a method of controlling retraction of a filament from a print head of a fused fabrication device, wherein the print head comprises a melt chamber and wherein the device comprises a feeder arranged to feed and retract the filament, the method comprising:
 a) order the filament feeder to retract the filament over a first distance, wherein the filament is not yet broken;
 b) stop heating the melt chamber;
 c) cooling the filament to a predefined temperature, and then
 d) order the filament feeder to further retract the filament over a second distance so as to break the filament.

According to a yet further aspect, there is provided a computer program product comprising code embodied on a computer-readable storage and configured so as when run on one or more processing units to perform the method as described above.

BRIEF DESCRIPTION OF THE DRAWINGS

These and other aspects of the invention are apparent from and will be elucidated with reference to the embodiments described hereinafter. In the drawings, FIG. 1 schematically shows a fused filament fabrication (FFF) device, according to an embodiment of the invention.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EMBODIMENTS

Figure 1:
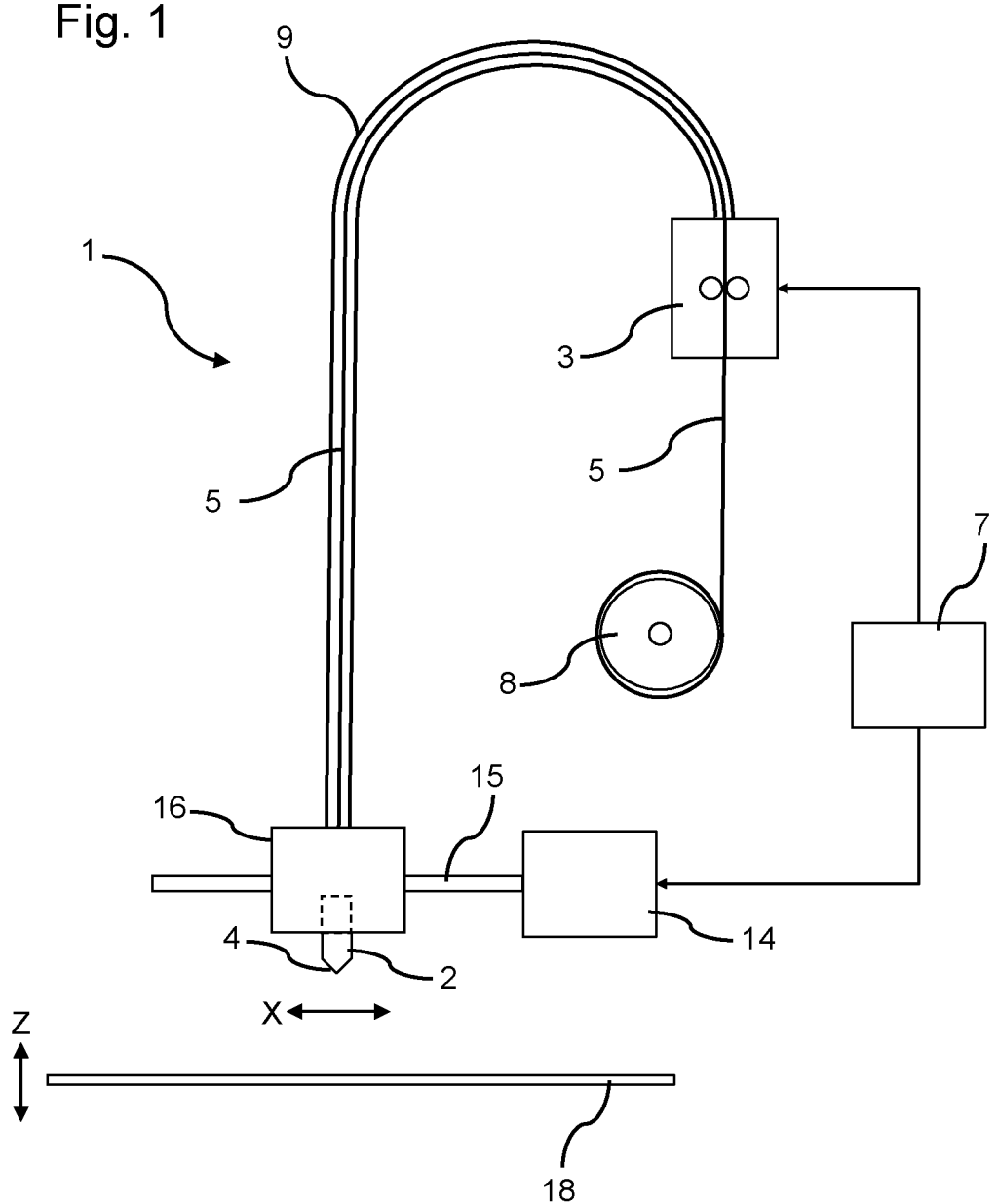

FIG. 1 schematically shows a fused filament fabrication (FFF) device 1, also referred to as the 3D printer, according to an embodiment of the invention. The 3D printer 1 comprises a print head 2 also referred to a deposition head 2. At its outer end the print head 2 comprises a nozzle 4 where molten filament can leave the deposition head 2. A filament 5 is fed into the print head 2 by means of a feeder 3. Part of the filament 5 is stored around a spool 8, which could be rotatably arranged onto a housing (not shown) of the 3D printer, or rotatably arranged within a container (not shown) containing one or more spools. The 3D printer 1 comprises a controller 7 arranged to control the feeder 3 and the movement of the print head 2, and thus of the nozzle 4. In this embodiment, the 3D printer further comprises a Bowden tube 9 arranged to guide the filament 5 from the feeder 3 to the print head 2.

The 3D printer 1 also comprises a gantry arranged to move the print head 2 at least in one direction, indicated as the X-direction. In this embodiment, the print head 2 is also movable in a Y-direction perpendicular to the X-direction. The gantry comprises at least one mechanical driver 14 and one or more axles 15 and a print head docking unit 16. The print head docking unit 16 holds the print head 2 and for that reason is also called the print head mount 16. It is noted that the print head docking unit 16 may be arranged to hold more than one print head, such as for example two print heads each receiving its own filament.

A build plate 18 may be arranged in or under the 3D printer 1 depending on the type of 3D printer. The build plate 18 may comprise a glass plate or any other object suitable as a substrate. In the example of FIG. 1, the build plate 18 is movably arranged relative to the print head 2 in a Z-direction, see FIG. 1.

The feeder 3 is arranged to feed and retract the filament 5 to and from the print head 2. The feeder 3 is arranged to feed and retract filament at different speeds to be determined by the controller 7.

Figure 2:
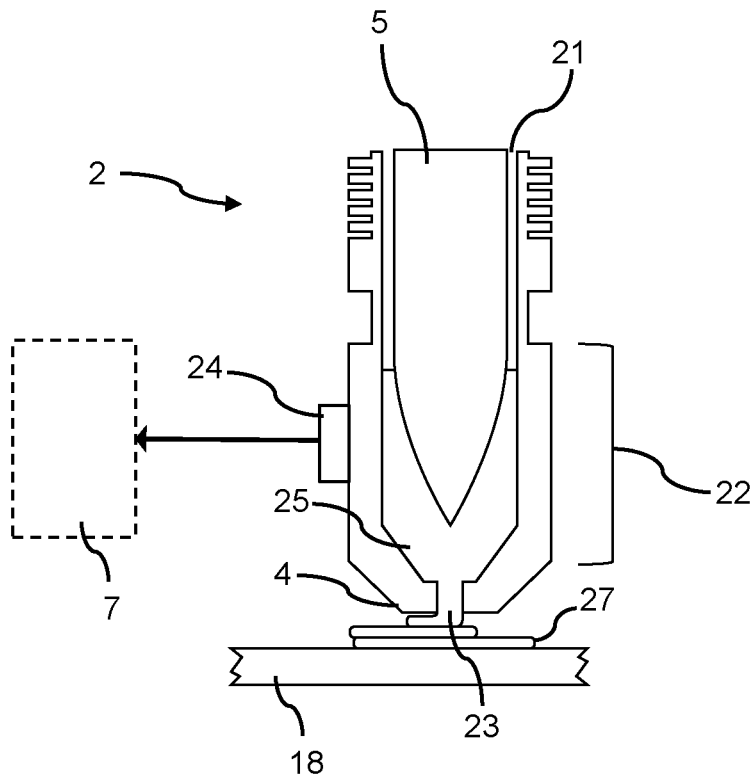
FIG. 2 schematically shows an example of the deposition head.

FIG. 2 schematically shows an example of the deposition head 2 having an inlet 21 for receiving the filament 5 of printable material, a melt chamber 22 and the nozzle 4 having an orifice 23 for letting out flowable printable material. The controller 7 is configured to control heating of the melt chamber 22 using a heating element (not shown). In this example, a temperature sensor 24 is arranged to measure a temperature of the melt chamber which is an indication of the temperature of molten material 25 in the melt chamber 22. The measured temperature is communicated to the controller 7, as indicated by the arrow in FIG. 2. In FIG. 2, the deposited material is indicated by reference number 27.

Figure 3:
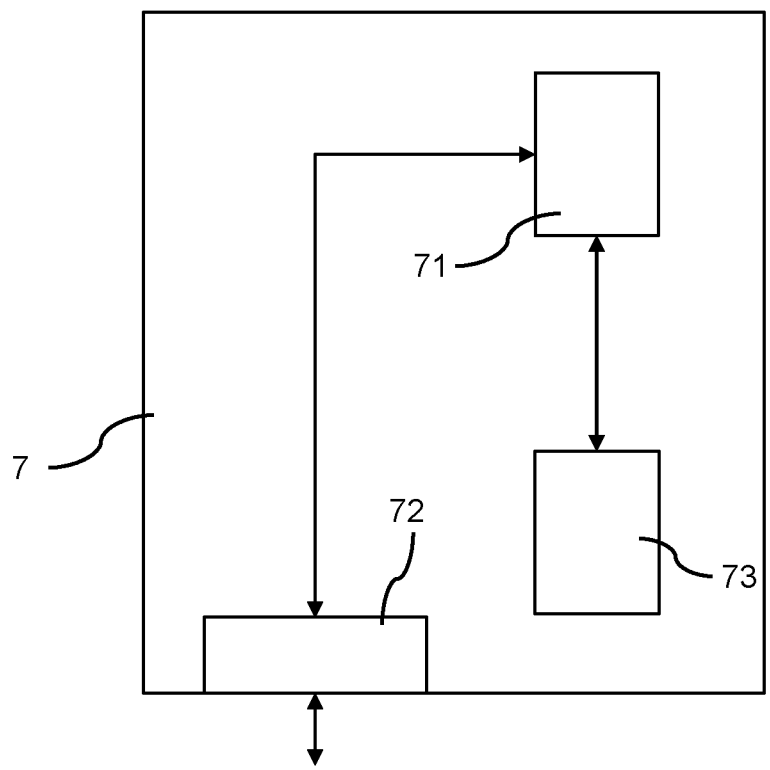
FIG. 3 schematically shows the controller according to an embodiment.
Figure 4:
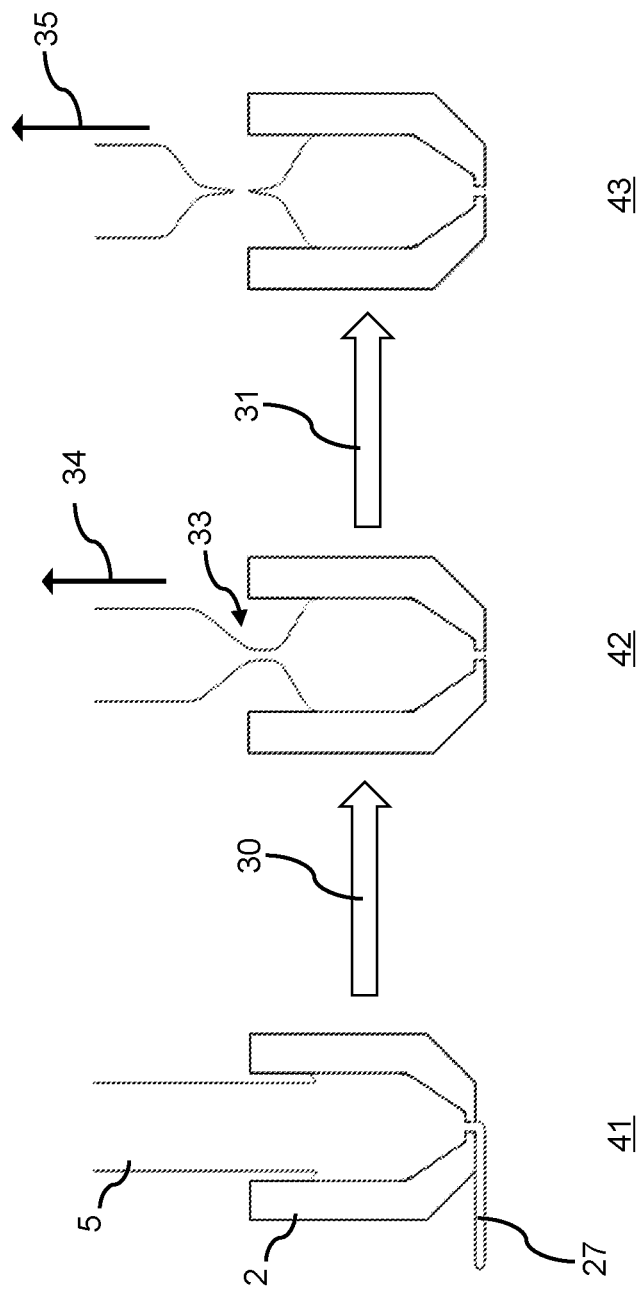
FIG. 4 shows several operating stages during the filament retraction process according to an embodiment of the invention.

FIG. 3 schematically shows the controller 7 according to an embodiment. The controller 7 comprises a processing unit 71, an I/O interface 72 and a memory 73. The processing unit 71 is arranged to read and write data and computer instructions from the memory 73. The processing unit 71 is also arranged to communicate with sensors and other equipment via the I/O interface 72. The memory 73 may comprise a volatile memory such as ROM, or a non-volatile memory such as a RAM memory, or any other type of computer-readable storage. The controller 7 may comprise several processing units. In FIG. 4 several operating stages (or steps) during the filament retraction process are indicated according to an embodiment of the invention. In FIG. 4 arrows 30, 31 indicate transitions between consecutive stages. The device 1 is printing in a printing stage 41 wherein the print head 2 is moved and molten filament material 27 is deposited on a build plate (not shown). In a next stage 42, the printing process is stopped by way of stopping the movement of the print head 2 and retracting the filament 5 so that deposition of the filament is stopped. Furthermore, the retraction, indicated by arrow 34, is to such an extent that a neck 33 occurs in the molten filament. In this embodiment, this first retraction is referred as the double retract, and preferably lies in a range of 10-20 mm.

After the first retract in stage 42, the print head is cooled off. In an embodiment this cooling is performed passively by way of stopping the heating of the melt chamber of the print head. It is noted that cooling fans arranged on or near the print head may support the cooling process. By cooling the print head the filament will also cool off and the neck 33 in the filament will harden. Only if the temperature of the print head is cooled to below a so-called hardening temperature, the filament is further retracted in a stage 43. This second retraction, indicated by arrow 35, will result in the breaking of the neck, and is therefore called the break retraction. This controlled breaking of the filament will produce a short tip of filament at the end of the retracted part of the filament. Contrary to the thread present if the warm retract of the prior art, this embodiment produces an outer end that can be reintroduced into a print head without the risk of failure during the feeding of the filament.

Figure 5:
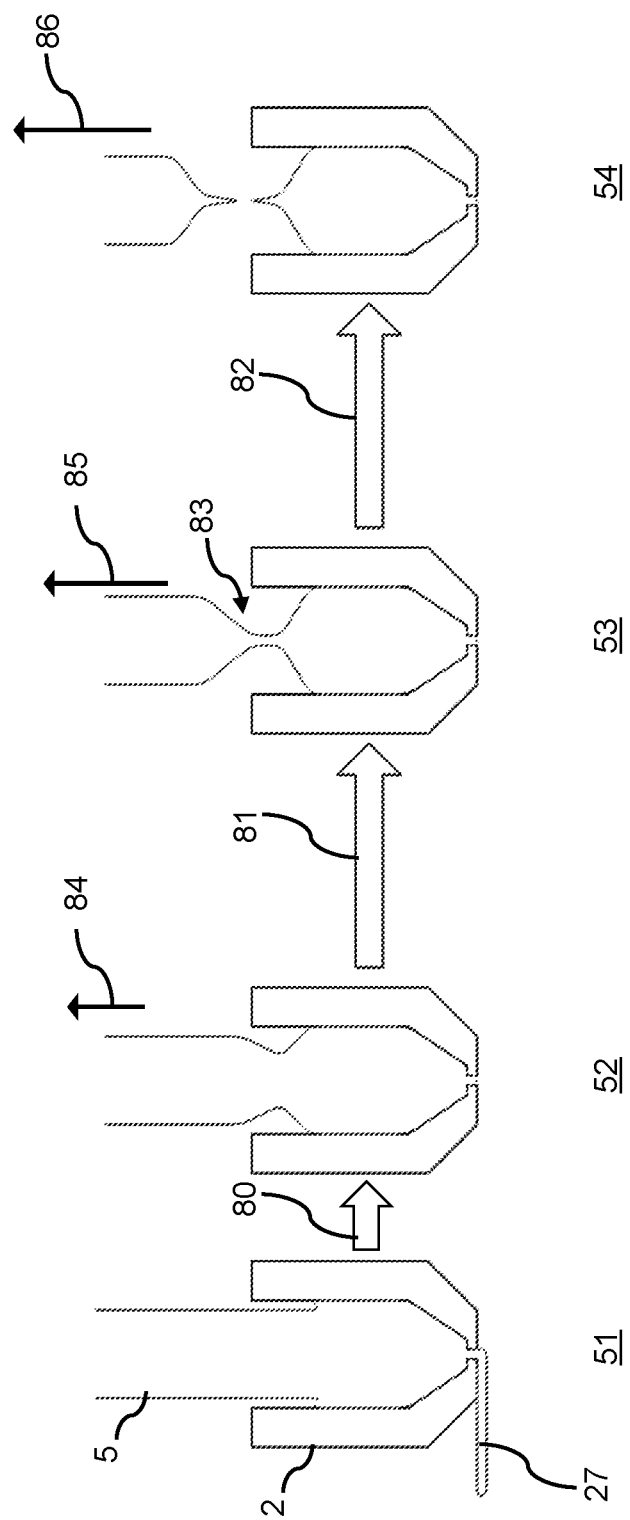
FIG. 5 shows several stages of the print head during the filament retraction process according to a further embodiment of the invention.

FIG. 5 shows several stages of the print head during the filament retraction process according to a further embodiment of the invention. In FIG. 5 arrows 80, 81, 82 indicate transitions between consecutive stages. At a stage 51 the print head 2 is moving and depositing material on a build plate (not shown). Then, at a stage 52, the print head has stopped moving and due to a first retraction of the filament, indicated by arrow 84, the deposition has stopped. In this embodiment, the first retraction is just enough so as to stop the deposition. This first retraction is also referred to as the short retract. Preferred values for the short retract distance lie between 0.5-10 mm. Due to the short retract a neck occurs, but the neck is thicker and shorter as compared to the process indicated in the previous embodiment shown in FIG. 4. In a next stage 53, the filament is retracted again. This retraction, indicated by arrow 85, is longer as compared to the first retraction and is therefore called the long retraction. In an embodiment, the filament is retracted over a distance between 5-15 mm during the long retract. Due to this long retraction the neck in the filament is stretched and becomes thinner and longer, see neck 83.

After the stage 53, the filament is cooled. Only if the temperature of the print head 2 is cooled to below the hardening temperature, the filament is further retracted at a stage 54. This will result in the breaking of the neck, and thus of the filament. Preferably the filament is retracted over a distance of at least 40 mm.

It is noted that between stage 52 and stage 53, the print head 2 may have been moved to a parking position in the printing device. During movement of the print head to the parking position, the heating of the print head 2 may proceed. But alternatively, the heating may already have been stopped before moving the print head to the parking position. This will speed up the retraction procedure, but may reduce control of the procedure as the long retract will be done at an uncontrolled temperature which lies between the printing temperature and the temperature at which the nozzle will ultimately cool down to.

In an embodiment, the filament during break retract is withdrawn over a distance that lies in a range of 20-80 mm. Other values are possible. A preferred retraction speed at the break retract, see stage 43, 54 lies in a range between 20-50 mm/s. Preferred values for the acceleration of the filament during the break retract lie in a range between 1000-4000 $mm/s^2$. It is noted that after the break retraction described above, the filament 5 can be further retracted by the feeder 3 so as to be stored back onto the spool 8. In an embodiment, the spool 8 is automatically rotated by a driver which may be synchronized with the feeder 3. In this way, the spool 8 can rotate in line with the retraction actions of the feeder 3. The spool 8 may be arranged to retract the filament out of the feeder. In this way a full retract can be performed. Following a full retract of a current filament, another filament can be fed into the feeder 3 and further into the print head 2. This process may be fully automated without interference by a user. This may be advantage in situations wherein an end-of-filament may occur at times at which a user is not present, such as during night times or other moments in which the printing device is left unguarded.

The embodiment described above with respect to FIGS. 4 and 5 are preferred when using amorphous printing material. Examples of such materials are ABS, PC and PLA. It is noted that PLA can crystallize, but PLA printing material does not crystallize in the timeframe of 3D printing and is therefore regarded as being amorphous in the context of this invention.

In case Acrylonitrile Butadiene Styrene (ABS) is used as a filament, the melt chamber 22 is heated to a temperature of 240° C. and cooled off to the predefined hardening temperature, which is around its glass-transition temperature $T_g$.

ABS has a glass-transition temperature $T_g$ between 80-90° C., and a preferred predefined hardening temperature lies between 60-100° C.

Typical thickness values of the filament 5 lie in a range of 1.5-3 mm. In an embodiment, a filament having a thickness of 2.85 mm is used.

Figure 6:
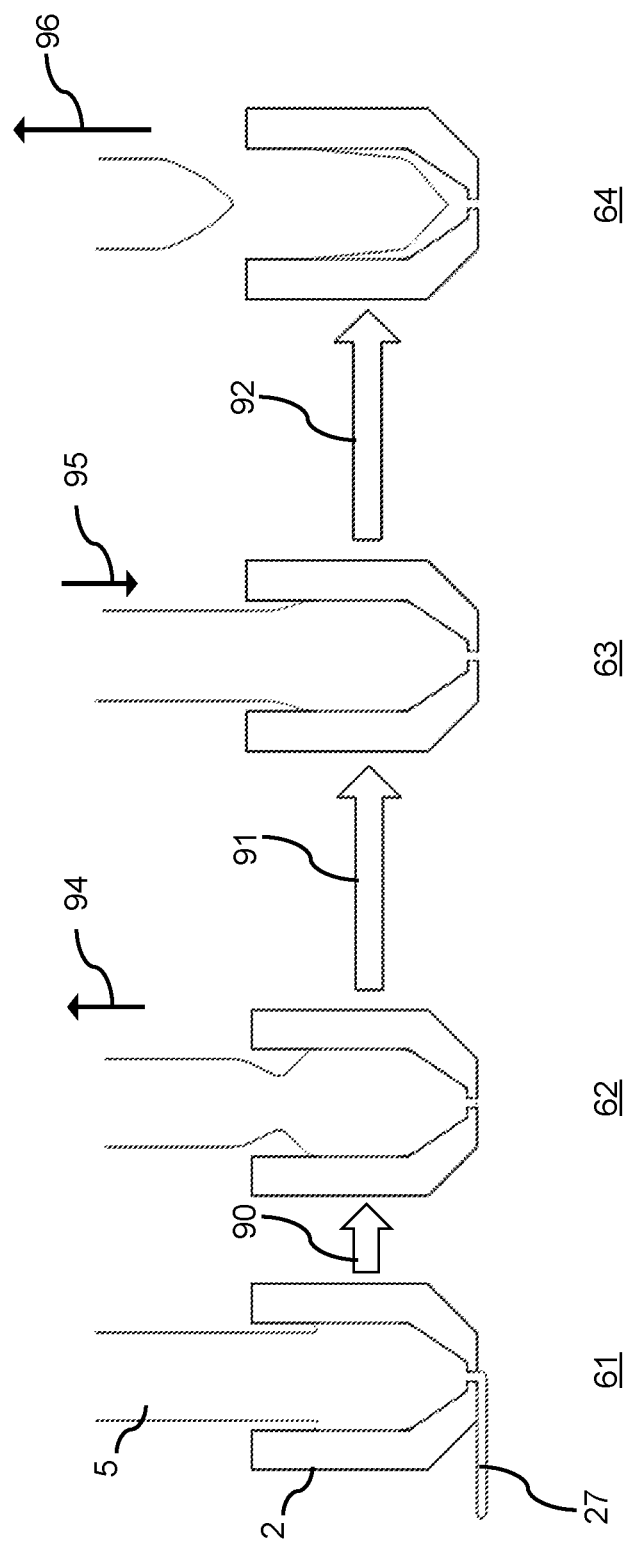
FIG. 6 shows several stages of the print head during the filament retraction process according to a further embodiment of the invention.

FIG. 6 shows several stages of the print head 2 during the filament retraction process according to a further embodiment of the invention. This embodiment is preferred when using crystalline materials as the printing material. In FIG. 6 arrows 90, 91, 92 indicate transitions between consecutive stages. At a stage 61 the print head 2 is moving and depositing material on a build plate (not shown). Then, at a stage 62, the print head has stopped moving and due to a first retraction of the filament, see arrow 94, the deposition has stopped. In this embodiment, the first retraction is just enough so as to stop the deposition. This first retraction is also referred to as the short retract. Preferred values for the short retract distance lie between 0.5-10 mm. Due to the short retract a thick neck occurs. In a next stage 63, the filament is fed back into the print head over the same distance as used before at the first retract, see arrow 95. Due to this so-called unretract the neck disappears, as can be seen at stage 63 of FIG. 6. After the stage 63, the filament is cooled. Only if the temperature of the print head 2 is cooled to below a predefined temperature, the filament is further retracted at a stage 64. Preferably the filament is retracted over a distance of at least 40 mm and with an acceleration between of at least 1000-4000 mm/s$^2$.

The embodiment described above with respect to FIG. 6 is preferred when using crystalline printing material. Examples of such materials are Nylon and Polyvinyl alcohol (PVA). The inventors have found that the retraction performed at stage 64 will result in the breaking of the filament within the melt chamber when using crystalline printing materials. During lab tests, it showed that the filament is broken along a curved break line which comes near the nozzle orifice 23, see also FIG. 6. This curvature and location of the break line is preferred because now almost all of the filament is retracted out of the print head 2 and very little material remains in the melt chamber. This remainder can easily be purged in a purge session. Furthermore, a very neat break in the filament occurs without any thread at the tip of the retracted filament as was the problem in the prior art methods.

The predefined temperature at which the break retract is executed, may depend on the print material used. In an embodiment, the predefined temperature lies between 50-100° C. Such temperatures are preferred for amorphous materials, such as ABS. In another embodiment, the predefined temperature lies in a range of 100-200° C. Such temperatures are preferred for crystalline materials, such as Nylon.

In the embodiments described with reference to FIGS. 4, 5 and 6, the filament retraction process is started during a printing process. In those situations the controller 7 may first receive a signal indicative of an interruption of the printing process, and will then stop the movement of the print head 2. Alternatively, the filament retraction process may also be performed with a heated print head that is not moving. For example, the print head 2 may be in a parking location, and the user may have instructed the printer to heat the print head 2 in order to start the filament retraction process.

The present invention has been described above with reference to a number of exemplary embodiments as shown in the drawings. Modifications and alternative implementations of some parts or elements are possible, and are included in the scope of protection as defined in the appended claims. It should be noted that the above-mentioned embodiments illustrate rather than limit the invention, and that those skilled in the art will be able to design many alternative embodiments. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. A fused filament fabrication device, the device comprising:
    a print head having an inlet for receiving a filament of printable material, a melt chamber and an outlet for letting out flowable printable material;
    a filament feeder arranged to feed the filament into the print head and arranged to retract the filament from the print head;
    a controller configured to control heating of the melt chamber and to control the filament feeder, wherein the controller is configured to:
        a) order the filament feeder to retract the filament over a first distance, wherein the filament is not yet broken;
        b) stop heating the melt chamber;
        c) cooling the filament to a predefined temperature, and then
        d) order the filament feeder to further retract the filament over a second distance so as to break the filament.

2. The device according to claim 1, wherein the first distance is just enough to stop depositing the flowable printable material.

3. The device according to claim 1, wherein the first distance lies in a range of 0.5-10 mm.

4. The device according to claim 1, wherein the controller is arranged to determine the first distance depending on at least one of: the printable material used, a cross-section of the outlet, a size of the melt chamber.

5. The device according to claim 1, wherein the controller is arranged to between step a) and step c) perform the step of:
    e) retract the filament over a third distance so as to create a neck in the filament.

6. The device according to claim 5, wherein the third distance lies in a range of 5-15 mm.

7. The device according to claim 1, wherein the first distance lies in a range of 10-20 mm.

8. The device according to claim 1, wherein the controller is arranged after step a) to feed the filament into the print head over a distance equal to the first distance.

9. The device according to claim 8, wherein due to the retraction over the second distance in step d) the filament is broken within the melt chamber of the print head.

10. The device according to claim 1, wherein the controller is arranged to before step a) perform the step of: move the print head to a parking position.

11. The device according to claim 1, wherein the second distance lies between 20-80 mm.

12. The device according to claim 1, wherein in step d) the filament is retracted with a speed lying in an range 20-50 mm/s.

13. The device according to claim 1, wherein in step d) the filament is retracted with an acceleration of lying in an range 1000-4000 mm/s$^2$.

14. The device according to claim 1, wherein the predefined temperature lies between 50-100° C. if the filament comprises an amorphous material, and between 100-200° C. if the filament comprises crystalline material.

15. Method of controlling retraction of a filament from a print head of a fused fabrication device, wherein the print head comprises a melt chamber and wherein the device comprises a feeder arranged to feed and retract the filament, the method comprising:
    a) order the filament feeder to retract the filament over a first distance, wherein the filament is not yet broken;
    b) stop heating the melt chamber-;
    c) cooling the filament to a predefined temperature, and then
    d) order the filament feeder to further retract the filament over a second distance so as to break the filament.

16. A computer program product comprising code embodied on a computer-readable storage and configured so as when run on one or more processing units to perform a method of controlling retraction of a filament from a print head of a fused fabrication device, wherein the print head comprises a melt chamber and wherein the device comprises a feeder arranged to feed and retract the filament, the method comprising:
 a) order the filament feeder to retract the filament over a first distance, wherein the filament is not yet broken;
 b) stop heating the melt chamber;
 c) cooling the filament to a predefined temperature, and then
 d) order the filament feeder to further retract the filament over a second distance so as to break the filament.

* * * * *